(12) United States Patent
Mishima et al.

(10) Patent No.: US 8,572,971 B2
(45) Date of Patent: Nov. 5, 2013

(54) BOILER APPARATUS

(75) Inventors: Nobuyoshi Mishima, Hitachi (JP);
Takashi Sugiura, Hitachinaka (JP);
Tetsuya Kosaka, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 339 days.

(21) Appl. No.: 13/027,381

(22) Filed: Feb. 15, 2011

(65) Prior Publication Data
US 2011/0232286 A1 Sep. 29, 2011

(30) Foreign Application Priority Data

Mar. 29, 2010 (JP) ................................ 2010-075235

(51) Int. Cl.
*F01K 17/00* (2006.01)
*F01K 7/32* (2006.01)

(52) U.S. Cl.
USPC ............................................. 60/648; 60/647

(58) Field of Classification Search
USPC ................................................... 60/645–681
See application file for complete search history.

(56) References Cited

U.S. PATENT DOCUMENTS

| | | | | |
|---|---|---|---|---|
| 3,835,650 | A * | 9/1974 | Chesmejef | 60/690 |
| 5,339,633 | A * | 8/1994 | Fujii et al. | 60/648 |
| 5,925,223 | A * | 7/1999 | Simpson et al. | 203/11 |
| 8,192,530 | B2 * | 6/2012 | Handagama et al. | 95/178 |
| 2005/0268594 | A1 * | 12/2005 | Kurihara et al. | 60/39.182 |
| 2006/0248890 | A1 * | 11/2006 | Iijima et al. | 60/645 |
| 2009/0031933 | A1 * | 2/2009 | Ookawa et al. | 110/345 |
| 2009/0293782 | A1 * | 12/2009 | Eriksson et al. | 110/205 |
| 2009/0297993 | A1 * | 12/2009 | Fan et al. | 431/4 |
| 2010/0050637 | A1 * | 3/2010 | Yamashita et al. | 60/653 |
| 2011/0094228 | A1 * | 4/2011 | Fan et al. | 60/679 |
| 2011/0120130 | A1 * | 5/2011 | Mishima et al. | 60/660 |
| 2011/0232286 | A1 * | 9/2011 | Mishima et al. | 60/670 |
| 2012/0192564 | A1 * | 8/2012 | Mishima et al. | 60/676 |
| 2012/0216540 | A1 * | 8/2012 | Stoever et al. | 60/653 |
| 2012/0227406 | A1 * | 9/2012 | Kosaka et al. | 60/667 |
| 2012/0247103 | A1 * | 10/2012 | Handagama et al. | 60/645 |

FOREIGN PATENT DOCUMENTS

JP    7-31834 A    2/1995

OTHER PUBLICATIONS

Adams, Deborah. Flue gas treatment for CO2 capture. IEA Clean Coal Centre. Jun. 2010.
Yokoyama et al. Hitachi's Carbon Dioxide Scrubbing Technology with New Absorbent for Coal Fired Power Plants. Science Direct. Energy Procedia. 2010.

* cited by examiner

*Primary Examiner* — Thomas Denion
*Assistant Examiner* — Steven D Shipe
(74) *Attorney, Agent, or Firm* — Crowell & Moring LLP

(57) ABSTRACT

A boiler apparatus is provided that generates a heat source capable of efficiently regenerating absorbing liquid while maintaining steam turbine efficiency to a maximum extent. The boiler apparatus includes: an economizer 54 preheating water serving as working fluid of a steam turbine system 500; an air preheater 69 installed downstream of the economizer 54; an evaporator 5 installed downstream of the economizer 54; an evaporator drum 6 using the water vapor from the evaporator 5 to generate saturated water vapor; a reboiler 20 using the saturated water vapor from the evaporator drum 6 to evaporate the absorbing liquid from a regeneration tower 23; a steam bypass pipe 15 connected to a steam pipe 14 through which the saturated water vapor from the evaporator drum 6 passes; a steam escape valve 16 installed in the steam bypass pipe 15; an exhaust gas bypass pipe 44 connected to an exhaust gas pipe 40 connecting the air preheater 69 with an absorption tower 26; and a butterfly valve 43 installed in the exhaust gas bypass pipe 44.

9 Claims, 2 Drawing Sheets

BOILER APPARATUS

BACKGROUND OF THE INVENTION

1. Field of the Invention

The present invention relates to a boiler apparatus installed in a power-generating plant provided with equipment that separates and recovers carbon dioxide from exhaust gas.

2. Description of the Related Art

Equipment (carbon dioxide separation-recovery equipment) that separates and recovers carbon dioxide in exhaust gas used to generate steam is installed in a power-generating plant provided with a steam turbine in some cases. The carbon dioxide separation-recovery equipment of this type includes an absorption tower and a regeneration tower. The absorption tower brings absorbing liquid such as amine or the like and exhaust gas into contact with each other to absorb carbon dioxide. The regeneration tower heats the absorbing liquid from the absorption tower to separate carbon dioxide therefrom, thereby regenerating the absorbing liquid.

There is known a method of using working fluid (steam) of a steam turbine as a heat source for the absorbing liquid in the above-mentioned regeneration tower. However, this method significantly lowers steam turbine efficiency. The following system is disclosed as a technology taking this point into consideration. A heat exchanger (absorbing liquid regeneration heat exchanger) which allows a portion of the absorbing liquid in a regeneration tower and exhaust gas to undergo heat exchange is installed on the exit side of denitrification equipment in a boiler apparatus. In addition, a portion of the absorbing liquid is circulated and supplied by a pump to the heat exchanger to heat the absorbing liquid in the regeneration tower. (See JP-7-31834-A)

SUMMARY OF THE INVENTION

However, the above-mentioned technology does not use steam as the heat source of the regeneration tower but uses the absorbing liquid (liquid) heated by the absorbing liquid regeneration heat exchanger. Because of this, an amount of heat is insufficient compared with the case where steam is used. Thus, there is a possibility that the absorbing liquid may not sufficiently be regenerated by the regeneration tower.

In the above-mentioned technology, the absorbing liquid regeneration heat exchanger allows absorbing liquid and exhaust gas to undergo heat exchange to heat the absorbing liquid. In the case of allowing the absorbing liquid and the exhaust gas to undergo heat exchange as described above, for some reason the function of the regeneration tower may come to rest and the supply of the absorbing liquid to the absorbing liquid regeneration heat exchanger may be stopped. In such a case, the heat exchange is not performed by the heat exchanger, so that there is a possibility that heat balance in the boiler apparatus may largely loses. In other words, in the above-mentioned technology, if the carbon dioxide separation-recovery equipment comes to rest, it becomes difficult for the boiler apparatus to operate alone. In the worst case, the steam turbine probably becomes impossible to operate.

It is an object of the present invention to provide a boiler apparatus that generates a heat source capable of regenerating absorbing liquid efficiently while keeping steam turbine efficiency to a maximum extent.

In order to achieve the above-object, according to an aspect of the present invention, there is provided a boiler apparatus that is installed in a power-generating plant and generates combustion gas from fuel and combustion air, the power-generating plant including absorption equipment allowing absorbing liquid to absorb carbon dioxide in exhaust gas, regeneration equipment separating carbon dioxide from the absorbing liquid having absorbed carbon dioxide in the absorption equipment, and a steam turbine system, the boiler apparatus including: an economizer allowing water and combustion gas to undergo heat exchange to preheat the water serving as working fluid of the steam turbine; an air preheater installed downstream of the economizer and allowing combustion air and combustion gas to undergo heat exchange to heat the combustion air; first steam generating means, installed downstream of the economizer, for allowing water and combustion gas to undergo heat exchange to generate saturated water vapor; second steam generating means for allowing the saturated water vapor from the first steam generating means and absorbing liquid from the regeneration equipment to undergo heat exchange to evaporate the absorbing liquid; a steam pipe allowing the first steam generating means and the second steam generating means to connect with each other; a steam bypass pipe connected to the steam pipe; means, installed in the steam bypass pipe, for opening and blocking flow of the saturated water vapor in the steam bypass pipe; an exhaust gas pipe allowing the air preheater and the absorption equipment to connect with each other; an exhaust gas bypass pipe connected to the exhaust gas pipe; and means, installed in the exhaust gas bypass pipe, for opening and blocking flow of the exhaust gas in the exhaust gas bypass pipe.

The present invention can efficiently regenerate absorbing liquid having absorbed carbon dioxide without lowering steam turbine efficiency.

DESCRIPTION OF THE PREFERRED EMBODIMENTS

Preferred embodiments of the present invention will hereinafter be described with reference to the drawings.

Figure 1:
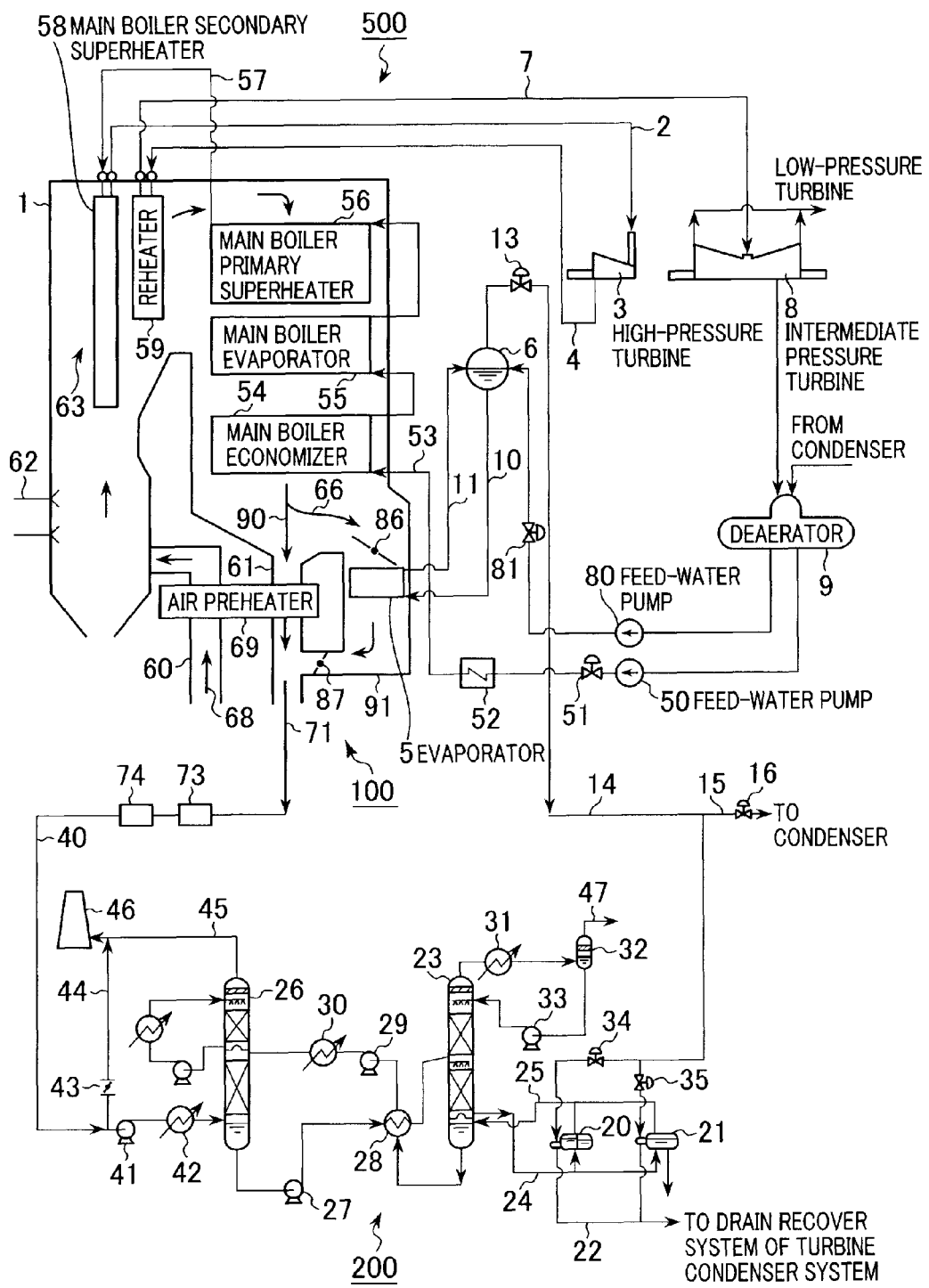
FIG. 1 is a schematic diagram of a power-generating plant according to a first embodiment of the present invention.

FIG. 1 is a schematic diagram of a power-generating plant according to a first embodiment of the present invention. The power-generating plant illustrated in the figure includes a steam turbine system 500 and carbon dioxide separation-recovery equipment 200.

The steam turbine system 500 includes a deaerator 9, a boiler apparatus 100, a high-pressure turbine 3, an intermediate pressure turbine 8, a low-pressure turbine (not illustrated), and a condenser (not illustrated). The carbon dioxide separation-recovery equipment 200 includes an absorption tower 26, a regeneration tower 23 and a reboiler 20.

The deaerator 9 heats and deaerates steam condensate fed from a condenser by use of extraction steam from the intermediate pressure turbine 8. In the present embodiment, water deaerated by the deaerator 9 is fed to a main boiler economizer 54 or an evaporator drum 6 by a feed-water pump 50 or a feed-water pump 80, respectively.

The boiler apparatus 100 includes a main boiler 1, an air preheater 69, burners 62, the main boiler economizer 54, a main boiler evaporator 55, a main boiler primary superheater 56, a reheater 59, a main boiler secondary superheater 58, an evaporator 5, the evaporator drum 6, a steam pipe 14, a steam bypass pipe 15 and a steam escape valve 16.

The air preheater 69 allows combustion air 68 sucked from an inlet duct 60 and combustion gas 90 having passed a first combustion gas passage 61 to undergo heat exchange to heat the combustion air 68. The air preheater 69 is installed on the downstream side of the main boiler economizer 54 in the combustion gas flow direction.

Boiler fuel (e.g. fossil fuel) is fed to the burners 62. The boiler fuel burns with the combustion air 68 from the air preheater 69 to generate high-temperature combustion gas. The combustion gas 63 generated is sequentially subjected to heat exchange in the main boiler secondary superheater 58, the reheater 59, the main boiler primary superheater 56, the main boiler evaporator 55, the main boiler economizer 54, the air preheater 69, and the evaporator 5, etc. in the main boiler 1, and is discharged into a exhaust gas pipe (exhaust gas duct) 40.

The main boiler economizer 54 is connected to the deaerator 9 via a feed-water pipe 53 and preheats feed-water fed from the feed-water pipe 53. The feed-water pump 50, a flow-regulating valve 51, and a high-pressure feed-water heater 52 are installed in the feed-water pipe 53. The main boiler evaporator 55 is a portion that evaporates water heated by the main boiler economizer 54. The main boiler primary superheater 56 is a portion that superheats water vapor from the main boiler evaporator 55. The main boiler secondary superheater 58 is a portion that further superheats superheated steam from the main boiler primary superheater 56. The superheated steam (main steam) generated by the main boiler secondary superheater 58 is led as working fluid into the high-pressure turbine 3 via the main steam pipe 2 for drivingly rotating the high-pressure turbine 3.

The steam having drivingly rotated the high-pressure turbine 3 is led into the reheater 59 in the main boiler 1 via the exhaust pipe 4 and superheated again. The steam superheated by the reheater 59 is led as working fluid into the intermediate pressure turbine 8 via the steam pipe 7 for drivingly rotating the intermediate pressure turbine 8. The steam having drivingly rotated the intermediate pressure turbine 8 drivingly rotates the low-pressure turbine and then is condensed by the condenser. The water condensed by the condenser is raised in pressure by a pump (not illustrated) and fed to the deaerator 9 while being appropriately heated by the feed-water heater (not illustrated).

The evaporator 5 and the evaporator drum 6 function as steam generating means (first steam generating means, or generator) which uses the heat of the combustion gas 66 having been used to generate the working fluid in the steam turbine system 500, and generates saturated water vapor to be used for the regeneration of the absorbing liquid.

The evaporator 5 allows the water from the evaporation drum 6 and the combustion gas 66 having been used to generate the main steam to undergo heat exchange to generate water vapor. In addition, the evaporator 5 is installed on the downstream side of the main boiler economizer 54 in the combustion gas flow direction in the main boiler 1. The water in the evaporator drum 6 is led into the evaporator 5 via a downcomer 10. The water vapor generated in the evaporator 5 is supplied to the evaporator drum 6 via a evaporator pipe 11.

The evaporator 5 in the present embodiment is installed on a second combustion gas passage 91 installed parallel to a first combustion gas passage 61 on which the air preheater 69 is installed as illustrated in FIG. 1. The upstream side of the second combustion gas passage 91 is connected to between the main boiler economizer 54 and the air preheater 69. The downstream side of the second combustion gas passage 91 is connected to the downstream side of the air preheater 69. If the evaporator 5 is installed on the second combustion gas passage 91 installed as described above, it is possible to lead, to the evaporator 5, the combustion gas 66 having almost the same temperature as that of the combustion gas 90 led into the air preheater 69. Therefore, the design of the boiler apparatus 100 is easy compared with the case where the air preheater 69 and the evaporator 5 are arranged in series and combustion gases having the different temperatures are led into both (a second embodiment to be described later). The second combustion gas passage 91 can be installed additionally to an existing boiler apparatus. Therefore, if the present invention is applied to an existing boiler apparatus that has been remodeled, it is preferable that the existing boiler apparatus be configured as in the present embodiment.

Incidentally, it is preferable that a damper 86 and a damper 87 be installed as means for opening and blocking the flow of combustion gas in the second combustion gas passage 91 on the upstream side and the downstream side, respectively, of the evaporator 5 in the second combustion gas passage 91, as in the present embodiment. The provision of the dampers 86, 87 as described above can block the second combustion gas passage 91 when it is not necessary to feed water vapor to the reboiler 20. Thus, the function of the evaporator 5 can be disabled. In addition, the situation can be avoided in which the saturated steam for the reboiler 20 is generated to wastefully consume the heat of combustion gas. Incidentally, if the second combustion gas passage 91 is blocked, a flow rate of combustion gas flowing into the first combustion gas passage 61 is increased to increase an exchangeable heat quantity in the air heater 69. However, if the flow rate of the combustion air 68 led into the air preheater 69 is increased by flow regulating means such as a fan or the like in accordance with such an increased flow rate of the combustion gas, such an increased heat quantity can be recovered in the boiler apparatus 100.

The evaporator drum 6 brings the water vapor from the evaporator 5 and water from the deaerator 9 into direct contact with each other to generate saturated water vapor. In addition, the evaporator drum 6 is installed outside a furnace of the main boiler 1. The saturated water vapor generated in the evaporator drum 6 has temperature and pressure relatively lower than those of main steam generated via the main boiler secondary superheater 58 and the like. A flow regulating valve 81 regulating an amount of water fed to the evaporator drum 6 from the deaerator 9 is installed in a pipe connecting the evaporator drum 6 with the deaerator 9. The pressure in the evaporator drum 6 can be regulated by a drum pressure regulating valve 13 installed in the steam pipe 14 on the exit side of the evaporator drum 6. The saturated water vapor generated in the evaporator drum 6 is reduced in pressure by the pressure regulating valve 13 and a pressure regulating valve 34 on the steam pipe 14 to become low-temperature low-pressure steam, which is fed as a heat source to the reboiler 20.

The steam pipe 14 is connected to the evaporator drum 6 and to the reboiler 20. The saturated water vapor generated in the evaporator drum 6 flows through the steam pipe 14. The steam bypass pipe 15 is connected to the steam pipe 14. The steam bypass pipe 15 is connected to the condenser. The steam escape valve 16 is installed, in the steam bypass pipe 15, as means for opening and blocking the flow of the saturated water vapor from the steam pipe 14 to the steam bypass pipe 15. If the steam escape valve 16 is closed, the saturated water vapor from the evaporator drum 6 can be fed to the reboiler 20. In contrast, if the steam escape valve 16 is opened, the saturated water vapor can be allowed to escape into the condenser without being fed to the reboiler 20.

The reboiler 20 allows the saturated water vapor from the steam pipe 14 and the absorbing liquid from the regeneration tower 23 to undergo heat exchange to evaporate the absorbing liquid (second steam generating means, or generator). The reboiler 20 heats such vapor to a temperature where the rich absorbing liquid in the regeneration tower 23 can be regenerated. Connected to the reboiler 20 are an absorbing liquid extraction pipe 24 through which the absorbing liquid stored in the regeneration tower 23 flows and a steam pipe 25 through which the steam generated by heating the absorbing liquid by the saturated water vapor flows. The steam pipe 25 is connected to the regeneration pipe 23. The vapor generated by the reboiler 20 is used as a heat source when carbon dioxide is separated from the rich absorbing liquid. The water vapor fed to the reboiler 20 via the steam pipe 14 undergoes heat exchange, in the reboiler 20, with the absorbing liquid from the absorbing liquid extraction pipe 24 to be condensed. The condensed water vapor is fed to a drain recovery system of a turbine condensate system in the steam turbine system 500 via a drain pipe 22 and fed to the deaerator 9 again.

Incidentally, the steam pipe 14 in the present embodiment bifurcates at a position on the downstream side of the joint portion with the steam bypass pipe 15. A reclaimer 21 (absorbing liquid purifier) is installed on the downstream side of such a bifurcated position. The reclaimer 21 allows the saturated water vapor from the steam pipe 14 and the absorbing liquid from the regeneration tower 23 to undergo heat exchange to separate impurities contained in the absorbing liquid, discharging them to the outside of the system. Similarly to the reboiler 20, the absorbing liquid is fed to the reclaimer 21 via the extraction pipe 24. The absorbing liquid (vapor) purified here, along with the steam generated in the reboiler 20, is circulated back to the regeneration tower 23 via the steam pipe 25. The pressure regulating valve 34 and the pressure regulating valve 35 installed in the steam pipe 14 regulates the flow rate of the water vapor fed to the reboiler 20 and the reclaimer 21, respectively. In this way, they can regulate the temperature and pressure of the steam generated in the reboiler 20 and the reclaimer 21, to respective desired values.

The exhaust gas pipe 40 is adapted to receive combustion gas (exhaust gas) 71 passing therethrough, the combustion gas 71 having passed through the air preheater 69 and the evaporator 5. The exhaust gas pipe 40 is connected to the absorption tower 26. In other words, the exhaust gas 71 from the exhaust gas pipe 40 is fed as raw material gas for the carbon dioxide separation-recovery equipment 200 to the absorption tower 26. Desulfurization equipment 73, pre scrubber 74, a boost fan 41 and a cooler 42 are installed in the exhaust gas pipe 40 from the upstream side toward the downstream side in the flow direction of the exhaust gas 71.

An exhaust gas bypass pipe 44 is connected to the exhaust gas pipe 40 between the pre scrubber 74 and the boost fan 41. A butterfly valve 43 as means for opening and blocking the flow of exhaust gas in the exhaust gas bypass pipe 44 is installed in the exhaust gas bypass pipe 44. The exhaust gas bypass pipe 44 is connected to an exhaust gas pipe 45 at a position on the downstream side in the exhaust gas flow direction. The exhaust gas pipe 45 is connected to a funnel 46. If the butterfly valve 43 is closed, the exhaust gas 71 of the boiler apparatus 100 is fed to the absorption tower 26 via the boost fan 41 and the cooler 42. In contrast, if the butterfly valve 43 is opened, the exhaust gas 71 of the boiler apparatus 100 is discharged to the outside of the system (into the atmosphere) via the funnel 46 without being fed to the absorption tower 26.

The absorption tower (absorption equipment) 26 brings the exhaust gas from the exhaust gas pipe 40 and the absorbing liquid such as amine or the like into direct contact with each other to absorb carbon dioxide in the exhaust gas. The exhaust gas from which carbon dioxide was separated in the absorption tower 26 is discharged to the outside of the system via the exhaust gas pipe 45 and the funnel 46. In contrast, the absorbing liquid (rich absorbing liquid) having absorbed carbon dioxide in the absorption tower 26 is increased in pressure by a transfer pump 27 and heated in the heat exchanger 28 before being fed to the regeneration tower 23.

The regeneration tower (regeneration equipment) 23 brings the rich absorbing liquid having absorbed carbon dioxide in the absorption tower 26 and the vapor from the reboiler 20 into direct contact with each other to heat the rich absorbing liquid, thereby separating carbon dioxide from the rich absorbing liquid. A portion of the absorbing liquid stored in the regeneration tower 23 is divided and fed to the reboiler 20 and the reclaimer 21 via the extraction pipe 24. The absorbing liquid heated for evaporation in the reboiler 20 and the reclaimer 21 is returned to the regeneration tower 23 via the steam pipe 25 and is used as a heat source for heating the rich absorbing liquid. A portion of the absorbing liquid (lean absorbing liquid) from which carbon dioxide is separated in the regeneration tower 23 is increased in pressure by a transfer pump 29 and cooled in a cooler 30. Thereafter, it is fed to the absorption tower 26 and reused to separate carbon dioxide from the exhaust gas 71. In short, with the configuration described above, the absorbing liquid is circulated between the absorption tower 26 and the regeneration tower 23.

In contrast, carbon dioxide separated from the absorbing liquid in the regeneration tower 23 is fed to a reflex drum 32 via a cooler 31 installed at the exit of the regeneration tower 23. The reflex drum 32 is adapted to separate moisture contained in carbon dioxide gas. Carbon dioxide from which the moisture is separated in the reflex drum 32 is fed to a liquefied carbon dioxide storing installation (not illustrated) via an exhaust pipe 47 connected to the reflex drum 32. The moisture separated in the reflex drum 32 is increased in pressure by a pump 33 and returned to the regeneration tower 23.

A description is next given of the operation of the power-generating plant configured as described above.

In general, the steam required by the reboiler for the regeneration tower in the carbon dioxide separation-recovery equipment is not superheated steam but saturated steam at approximately 0.3 MPaG/143° C. In contrast, the pressure/temperature conditions of steam required by general large turbines for power generation are increasing yearly. To cite an example, recent thermal power generation boilers for big project often employ a supercritical pressure steam condition (25 MPaG/600° C.) as a boiler steam condition. That is, a difference is significant between the steam condition required by the reboiler for the regeneration tower and that required for power generation. In other words, the steam condition required by the reboiler needs not superheated energy such as supercritical pressure steam condition but a large amount of saturated steam with low-temperature. In the present embodiment, in order for the combustion gas of the main boiler 1 to generate the steam required by the reboiler 20 for the regeneration tower 23, the evaporator 5 is installed at the exit of the main boiler economizer 54 and the evaporator drum 6 is installed outside the furnace of the boiler 1. This makes it possible for the main boiler 1 to concurrently generate not only the main steam for power generation but low-pressure low-temperature steam for the reboiler. If the main boiler 1 is configured as described above, it is not necessary to supply part of the main steam to the reboiler 20 for the regeneration tower 23. Thus, it is possible to suppress the lowering of steam turbine efficiency. In addition, with the configuration of the main boiler 1 as described above, it is possible to eliminate a piping valve device and the like that reduce the pressure and temperature of the main steam, which are used to extract steam for the reboiler 20 from the steam turbine system 500. This produces an economic effect. Further, a dedicated auxiliary boiler for the reboiler 20 becomes unnecessary, which also produces an economic effect.

In the power-generating plant configured as described above, when the carbon dioxide separation-recovery equipment 200 is operated (i.e., the regeneration tower 23 and the absorption tower 26 are operated) while operating the steam turbine system 500, the dampers 86 and 87 are opened and the steam escape valve 16 and the butterfly valve 43 are closed.

If the dampers 86 and 87 are opened as mentioned above, the second combustion gas passage 91 is opened to lead combustion gas to the evaporator 5. This allows the evaporator 5 to generate steam, which heats water in the evaporator drum 6 to generate saturated water vapor. Since the steam escape valve 16 is closed at this time, the saturated water vapor generated in the evaporator drum 6 is led into the reboiler 20 via the steam pipe 14. The water vapor led into the reboiler 20 heats the absorbing liquid led via the extraction pipe 24 to evaporate this. The absorbing liquid evaporated in the reboiler 20 is led into the regeneration tower 23 via the steam pipe 25 to come into contact with the rich absorbing liquid from the absorption tower 26, which separates carbon dioxide from the rich absorbing liquid.

Since the butterfly valve 43 is closed, the exhaust gas 71 having flowed through the exhaust gas pipe 40 is fed to the absorption tower 26 via the boost fan 41 and the cooler 42. The absorbing liquid (lean absorbing liquid) regenerated in the regeneration tower 23 as described above comes into contact with the exhaust gas from the main boiler 1 to absorb carbon dioxide from the exhaust gas in the absorption tower 26. The absorbing liquid (rich absorbing liquid) having absorbed the carbon dioxide is led via the transfer pump 27 and the heat exchanger 28 to the regeneration tower 23 for regeneration. Thereafter, the absorbing liquid circulates and flows between the absorption tower 26 and the regeneration tower 23 to repeat the recovery-separation of carbon dioxide in exhaust gas.

Incidentally, if the carbon dioxide separation-recovery equipment is to be stopped or is stopped (i.e., the regeneration tower 23 and the absorption tower 26 are stopped) from the state where the steam turbine system 500 and the carbon dioxide separation-recovery equipment 200 are in operation as described above, the steam escape valve 16 and the butterfly valve 23 are opened.

If the steam escape valve 16 is opened as mentioned above, the saturated water vapor generated in the evaporator drum 6 is discharged to the condenser via the steam bypass pipe 15 without being fed to the reboiler 20. If the butterfly valve 23 is opened, the exhaust gas 71 from the main boiler 1 is directly discharged from the funnel 46 via the exhaust gas bypass pipe 44 without being fed to the absorption tower 26. In this case, the working fluid remaining unchanged from the state before the carbon dioxide separation-recovery equipment 200 is stopped continues to be fed to the high-pressure turbine 3, the intermediate pressure turbine 8 and the low-pressure turbine. Therefore, the steam turbine system 500 can continuously be operated regardless of the operating conditions of the carbon dioxide separation-recovery equipment 200. In addition, since also the carbon dioxide separation-recovery equipment 200 can be started up alone after the steam turbine system 500 has been started up, it can be operated flexibly. Thus, in the present embodiment the absorbing liquid having absorbed carbon dioxide can be regenerated efficiently without lowering steam turbine efficiency.

Incidentally, in the above, it is preferable that the dampers 86 and 87 be operatively fully closed while operatively closing the steam escape valve 16. If the dampers 86 and 87 are operated as described above, the flow of combustion gas to the second combustion gas passage 91 can be blocked. Therefore, the generation of the saturated water vapor in the evaporator drum 6 can safely be stopped with the main boiler 1 remaining continuously operated. This can use the heat of the combustion gas generated in the main boiler 1 for other applications.

Figure 2:
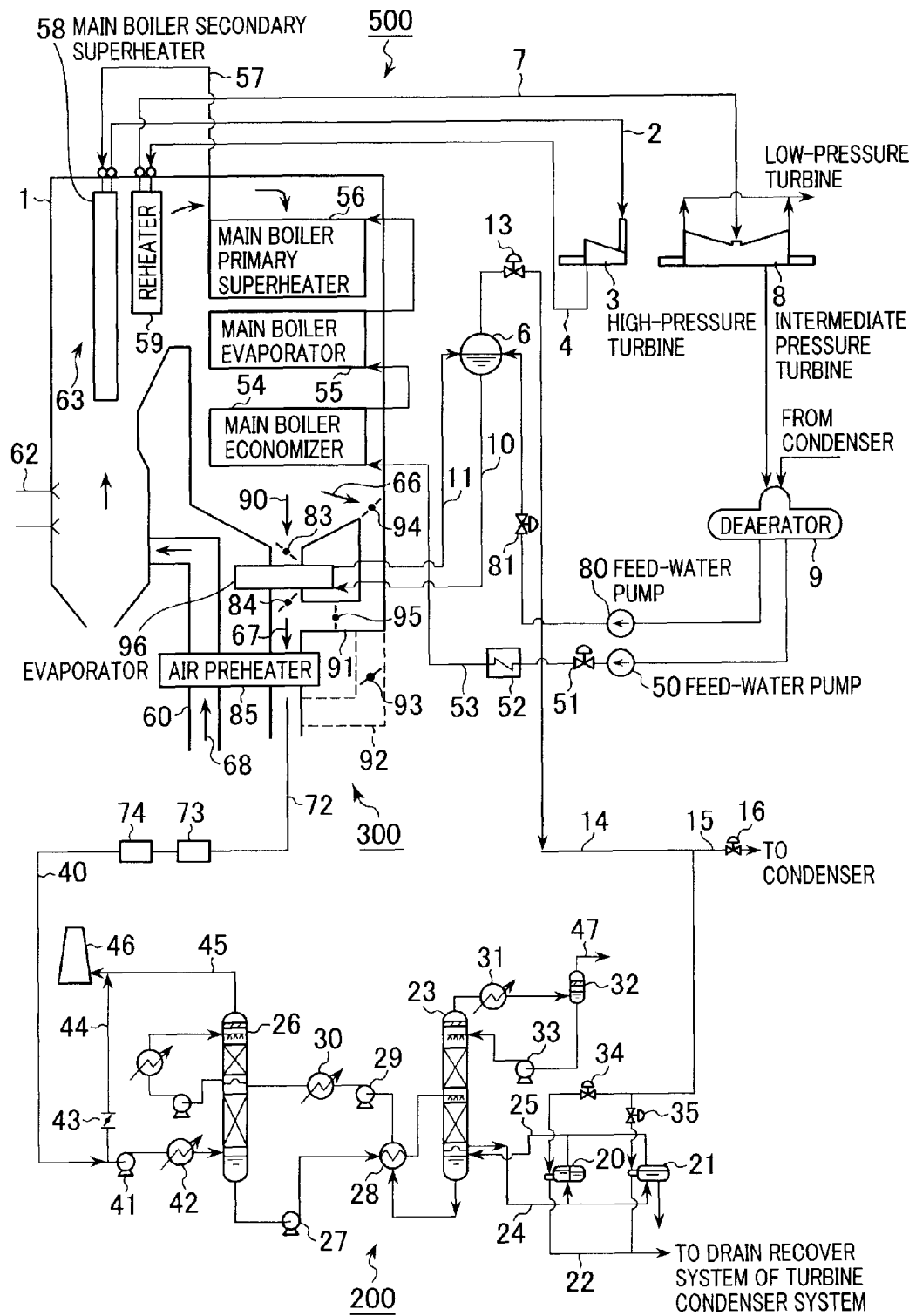
FIG. 2 is a schematic diagram of a power-generating plant according to a second embodiment of the present invention.

FIG. 2 is a schematic diagram of a power-generating plant according to a second embodiment of the present invention. Incidentally, the same portions as in FIG. 1 are denoted with like reference numerals and their explanation is omitted. The power-generating plant illustrated in FIG. 2 includes a boiler apparatus 300, which includes an air preheater 85 and an evaporator 96.

The air preheater 85 allows combustion gas 67 having passed through the evaporator 96 and combustion air 68 to undergo heat exchange to heat the combustion air 68. The air preheater 85 is installed on the first combustion gas passage 61. The evaporator 96 allows water from the evaporator drum 6 and combustion gas 90 having been used to generate main steam to undergo heat exchange to generate water vapor. The evaporator 96 is installed on the first combustion gas passage 61 at a position on the upstream side of the air preheater 85 in the combustion gas flow direction. In short, the evaporator 96 is installed in series with the air preheater 85.

Even if the evaporator 96 and the air preheater 85 are installed on the upstream side and on the downstream side respectively in the first combustion gas passage 61, saturated water vapor can be generated by the evaporator 96 and the evaporator drum 6. Therefore, when the regeneration tower 23 and the absorption tower 26 are stopped, if the steam escape valve 16 and the butterfly valve 23 are opened, the steam turbine system 500 can continuously be operated regardless of the operating condition of the carbon dioxide separation-recovery equipment 200 similarly to the first embodiment.

Also in the present embodiment, when the regeneration tower 23 and the absorption tower 26 are stopped, it is preferable that the evaporator boiler 6 be made not to generate saturated water vapor similarly to the first embodiment. For this reason, the damper 83, the damper 84, the second combustion gas passage 91, a damper 94 and a damper 95 are installed in the boiler apparatus of the present embodiment as illustrated in FIG. 2.

The dampers 83 and 84 are installed on the upstream side and the downstream side, respectively, of the evaporator 96 in the first combustion gas passage 61, and function as means for opening and blocking the flow of the combustion gas 90 to the evaporator 96.

The second combustion gas passage 91 is connected to the first combustion gas passage 61 so that its downstream side end portion is located between the evaporator 96 and the air preheater 85. Specifically, in the present embodiment, the evaporator 96 is located on the upstream side, in the combustion gas flow direction, of the meeting point of the second combustion gas passage 91 in the first combustion gas passage 61. In addition, the air preheater 85 is located on the downstream side, in the combustion gas flow direction, of the meeting point of the second combustion gas passage 91 in the first combustion gas passage 61. In this way, the second combustion gas passage 91 functions as a bypass passage adapted to supply the combustion gas just before passing through the evaporator 96, to between the evaporator 96 and the air preheater 85 without allowing it to pass through the evaporator 96.

The dampers 94 and 95 are installed on the upstream side and on the downstream side, respectively, of the second combustion gas passage 91, and function as means for opening and blocking the flow of the combustion gas in the second combustion gas passage 91.

With the configuration of the boiler apparatus 300 as described above, when the regeneration tower 23 and the absorption tower 26 are in operation, if the dampers 83 and 84 are fully opened and also the dampers 94 and 95 are fully closed, combustion gas can be allowed to pass through only the second combustion gas passage 91. This can generate saturated water vapor in the evaporator drum 6. In contrast, if the regeneration tower 23 and the absorption tower 26 are stopped, the dampers 83 and 84 having been opened until then are fully closed and the dampers 94 and 95 having been closed until then are fully opened. This can block the flow of combustion gas to the evaporator 96 to stop the generation of saturated water vapor in the evaporator drum 6.

Incidentally, if the dampers 83, 84, 94, 95 are operated as described above, the combustion gas having passed through the main boiler economizer 54 is directly passed through the air preheater 85 via the second combustion gas passage 91. Therefore, the temperature of the combustion gas 67 flowing into the air preheater 85 more rises than that before the operation of the dampers 83, 84, 94, 95. Thus, in view of the continuous operation with the efficiency of the steam turbine system 500 maintained, it is preferable that a device be made to keep thermal balance in the boiler apparatus 300 before and after the operation of the dampers 83, 84, 94, 95. The device of this kind is first a method (A) in which the thermal balance is kept by increasing the flow rate of the combustion air 68 by use of flow regulating means such as a fan or the like in accordance with the increased temperature of the combustion gas 67. The device of the kind is secondly a method (B) as below. As illustrated with broken lines in FIG. 2, a third combustion gas passage 92 is installed that is adapted to supply the combustion gas flowing in the second combustion gas passage 91, to the downstream side of the air preheater 85 without allowing it to pass through the air preheater 85. In addition, a damper 93 is installed on the third combustion gas passage 92, the damper 93 serving as means for regulating the flow rate of the combustion gas flowing in the third combustion gas passage 92. With the configuration of the boiler apparatus 300 as described above, the flow rate of the combustion gas passing through the third combustion gas passage is adjusted by the damper 93. This can regulate the heat quantity of the combustion gas 67 flowing into the air preheater 85 to a comparable level to that before the operation of the dampers 83, 84, 94, 95. Incidentally, in this case (B), it may be necessary to further finely adjust the heat quantity of the combustion gas 67 led into the air preheater 85. In such a case, a damper is additionally installed on the inlet side of the air preheater 85 in the first combustion gas passage 61 and the flow rate of combustion gas led into the air preheater 85 is appropriately regulated by means of the damper.

What is claimed is:

1. A boiler apparatus that is installed in a power-generating plant and generates combustion gas from fuel and combustion air, the power-generating plant including absorption equipment allowing absorbing liquid to absorb carbon dioxide in exhaust gas, regeneration equipment separating carbon dioxide from the absorbing liquid having absorbed carbon dioxide in the absorption equipment, and a steam turbine system, the boiler apparatus comprising:

an economizer allowing water and combustion gas to undergo heat exchange to preheat the water serving as working fluid of the steam turbine system;

an air preheater installed downstream of the economizer and allowing combustion air and combustion gas to undergo heat exchange to heat the combustion air;

a first steam generator, installed downstream of the economizer, for allowing water, utilized in the steam turbine system as working fluid, and combustion gas to undergo heat exchange to generate saturated water vapor;

a second steam generator for allowing the saturated water vapor from the first steam generator and absorbing liquid from the regeneration equipment to undergo heat exchange to evaporate the absorbing liquid;

a steam pipe allowing the first steam generating generator and the second steam generating generator to connect with each other;

a steam bypass pipe connected to the steam pipe and allowing steam in the steam pipe to flow into a condenser in the steam turbine system;

a valve installed in the steam bypass pipe for opening and blocking flow of the saturated water vapor in the steam bypass pipe;

an exhaust gas pipe allowing the air preheater and the absorption equipment to connect with each other;

an exhaust gas bypass pipe connected to the exhaust gas pipe; and a valve installed in the exhaust gas bypass pipe for opening and blocking flow of the exhaust gas in the exhaust gas bypass pipe.

2. The boiler apparatus according to claim 1, wherein the valve for opening and blocking the saturated water vapor blocks the flow of water vapor during operation of the regeneration equipment, and opens the flow of water vapor during stoppage of the regeneration equipment, and the valve for opening and blocking the exhaust gas blocks the flow of exhaust gas during operation of the absorption equipment, and opens the flow of exhaust gas during stoppage of the absorption equipment.

3. A boiler apparatus that is installed in a power-generating plant and generates combustion gas from fuel and combustion air, the power-generating plant including an absorption tower allowing absorbing liquid to absorb carbon dioxide in exhaust gas, a regeneration tower separating carbon dioxide from the absorbing liquid having absorbed carbon dioxide in the absorption tower, and a steam turbine system, the boiler apparatus comprising:

an economizer allowing water and combustion gas to undergo heat exchange to preheat the water serving as working fluid of the steam turbine system;

an air preheater installed downstream of the economizer and allowing combustion air and combustion gas to undergo heat exchange to heat the combustion air;

an evaporator installed downstream of the economizer and allowing water, utilized in the steam turbine system as working fluid, and combustion gas to undergo heat exchange to generate water vapor;

an evaporator drum bringing the water vapor from the evaporator and water into contact with each other to generate saturated water vapor;

a steam pipe connected to the evaporator drum and adapted to receive the saturated water vapor, passed therethrough, from the evaporator drum;

a reboiler allowing the saturated water vapor from the steam pipe and the absorbing liquid from the regeneration tower to undergo heat exchange to evaporate the absorbing liquid;

a steam bypass pipe connected to the steam pipe and allowing steam in the steam pipe to flow into a condenser in the steam turbine system;

a valve installed in the steam bypass pipe for opening and blocking flow of the saturated water vapor in the steam bypass pipe;

an exhaust gas pipe adapted to receive exhaust gas, passed therethrough, having passed through the air preheater, the exhaust gas pipe being connected to the absorption tower;

an exhaust gas bypass pipe connected to the exhaust gas pipe; and a valve installed in the exhaust gas bypass pipe for opening and blocking flow of the exhaust gas in the exhaust gas bypass pipe.

4. The boiler apparatus according to claim 3, wherein the evaporator is installed on a combustion gas passage installed parallel to a second combustion gas passage on which the air preheater is installed.

5. The boiler apparatus according to claim 4, wherein a damper for opening and blocking flow of combustion gas in the combustion gas passage is installed on the combustion gas passage.

6. The boiler apparatus according to claim 3, wherein the evaporator is installed to be located upstream of the air preheater in a combustion gas passage on which the air preheater is installed.

7. The boiler apparatus according to claim 6, further comprising:
a bypass passage adapted to supply combustion gas just before passing through the evaporator, to between the evaporator and the air preheater without allowing the combustion gas to pass through the evaporator;
a damper, installed on the combustion gas passage, for opening and blocking the flow of the combustion gas to the evaporator; and
a damper, installed on the bypass passage, for opening and blocking the flow of the combustion gas in the bypass passage.

8. The boiler apparatus according to claim 7, further comprising:
a second bypass passage adapted to supply the combustion gas flowing through the bypass passage toward the downstream side of the air preheater without allowing the combustion gas to pass through the air preheater; and
a damper, installed on the second bypass passage, for regulating a flow rate of the combustion gas flowing through the second bypass passage.

9. A power-generating plant comprising:
a steam turbine;
a boiler adapted to allow water and combustion gas to undergo heat exchange to generate water vapor driving the steam turbine;
absorption equipment adapted to allow absorbing liquid to absorb carbon dioxide in exhaust gas from the boiler;
regeneration equipment separating carbon dioxide from the absorbing liquid having absorbed carbon dioxide in the absorption equipment;
an economizer installed in the boiler and allowing water and combustion gas to undergo heat exchange to preheat the water serving as working fluid of the steam turbine;
an air preheater installed downstream of the economizer in the boiler and allowing combustion air and combustion gas to undergo heat exchange to heat the combustion air;
a first steam generator, installed downstream of the economizer in the boiler, for allowing water, utilized in the steam turbine system as working fluid, and combustion gas to undergo heat exchange to generate saturated water vapor;
a second steam generator for allowing the saturated water vapor from the first steam generator and absorbing liquid from the regeneration equipment to undergo heat exchange to evaporate the absorbing liquid;
a steam pipe allowing the first steam generator and the second steam generator to connect with each other;
a steam bypass pipe connected to the steam pipe and allowing steam in the steam pipe to flow into a condenser in the steam turbine system;
a valve, installed in the steam bypass pipe, for opening and blocking flow of the saturated water vapor in the steam bypass pipe;
an exhaust gas pipe allowing the air preheater and the absorption equipment to connect with each other;
an exhaust gas bypass pipe connected to the exhaust gas pipe; and
a valve, installed in the exhaust gas bypass pipe, for opening and blocking flow of the exhaust gas in the exhaust gas bypass pipe.

* * * * *